United States Patent
Kim et al.

(10) Patent No.: US 12,229,688 B2
(45) Date of Patent: *Feb. 18, 2025

(54) SYSTEM AND METHOD FOR PREDICTING FAILURE OF COMPONENTS USING TEMPORAL SCOPING OF SENSOR DATA

(71) Applicant: Utopus Insights, Inc., Valhalla, NY (US)

(72) Inventors: Younghun Kim, Pleasantville, NY (US); Guruprasad Srinivasan, Bangalore (IN); Tarun Kumar, Chappaqua, NY (US)

(73) Assignee: Utopus Insights, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,208

(22) Filed: Apr. 18, 2023

(65) Prior Publication Data

US 2023/0252307 A1    Aug. 10, 2023

Related U.S. Application Data

(63) Continuation of application No. 16/231,160, filed on Dec. 21, 2018, now Pat. No. 11,663,496.
(Continued)

(51) Int. Cl.
*G06N 5/02* (2023.01)
*F03D 17/00* (2016.01)
(Continued)

(52) U.S. Cl.
CPC ............... *G06N 5/02* (2013.01); *F03D 17/00* (2016.05); *G06N 7/01* (2023.01); *H02S 50/00* (2013.01); *F05B 2260/821* (2013.01)

(58) Field of Classification Search
CPC . G06N 5/02; G06N 7/01; G06N 20/00; F03D 17/00; H02S 50/00; F05B 2260/821; F05B 2260/84; Y02E 10/50
See application file for complete search history.

(56) References Cited

U.S. PATENT DOCUMENTS 11,663,496 B2 * 5/2023 Kim .................. F03D 17/00
                                                        702/181
11,868,906 B2 * 1/2024 Srinivasan ............... G06N 5/02
(Continued)

FOREIGN PATENT DOCUMENTS

CN         106059496 A    10/2016
CN         106712713 A    5/2017

OTHER PUBLICATIONS

European Search Report for Application No. 19748416.5, Feb. 28, 2022, 6 pages.
(Continued)

*Primary Examiner* — Manish S Shah
*Assistant Examiner* — Michael J Singletary
(74) *Attorney, Agent, or Firm* — Ahmann Kloke LLP

(57) ABSTRACT

An example method comprises receiving first historical data of a first time period and failure data, identifying at least some sensor data that was or potentially was generated during a first failure, removing the at least some sensor data to create filtered historical data, training a classification model using the filtered historical data, the classification model indicating at least one first classified state at a second period of time prior to the first failure indicated by the failure data, applying the classification model to second sensor data to identify a first potential failure state based on the at least one first classified state, the second sensor data being from a subsequent time period, generating an alert if the first potential failure state is identified based on at least a first
(Continued)

subset of sensor signals generated during the subsequent time period, and providing the alert.

20 Claims, 13 Drawing Sheets

Related U.S. Application Data

(60) Provisional application No. 62/623,713, filed on Jan. 30, 2018.

(51) Int. Cl.
*G06N 7/01* (2023.01)
*H02S 50/00* (2014.01)

(56) References Cited

U.S. PATENT DOCUMENTS

| | | | | |
|---|---|---|---|---|
| 2010/0138267 A1* | 6/2010 | Vittal | ............... | F03D 17/00 |
| | | | | 702/34 |
| 2012/0053984 A1* | 3/2012 | Mannar | ............ | G06Q 50/06 |
| | | | | 705/7.28 |
| 2012/0143565 A1* | 6/2012 | Graham, III | ...... | G05B 23/0237 |
| | | | | 702/181 |
| 2017/0308802 A1* | 10/2017 | Ramsøy | ............ | G06N 20/00 |

OTHER PUBLICATIONS

International Application No. PCT/US2019/015915, International Search Report and Written Opinion dated Jul. 9, 2019.

* cited by examiner

SYSTEM AND METHOD FOR PREDICTING FAILURE OF COMPONENTS USING TEMPORAL SCOPING OF SENSOR DATA

CROSS-REFERENCE TO RELATED APPLICATIONS

This application is a continuation of U.S. application Ser. No. 16/231,160, filed Dec. 21, 2018 and entitled "System and Method for Predicting Failure of Components using Temporal Scoping of Sensor Data," which claims priority to U.S. Provisional Patent Application No. 62/623,713, filed on Jan. 30, 2018 and entitled "Methods and Apparatus to Predict Failure of Components using Temporal Scoping of Sensor Data," both of which are incorporated in their entireties herein by reference.

FIELD OF THE INVENTION

Embodiments of the present invention(s) relate generally to forecast congestion in electrical networks. In particular, the present invention(s) relate to forecasting congestion in electrical networks by reducing complexity of the network and utilizing historical data to create a model to forecast congestion to enable proactive solutions.

DESCRIPTION OF RELATED ART

When an asset of an electrical network is overloaded, the asset (and perhaps the network) is congested. A path (or a collection of conductors) within the electrical network of a power company is congested when one or multiple current-carrying elements (e.g., conductors, transformers, AC lines, and the like) are operationally carrying an amount of power which exceeds a specific threshold, for a specific time-period.

Upon detection of existing congestion on an electrical network, transmission utilities typically undertake congestion mitigation steps, as opposed to congestion forecasting and proactive congestion management or congestion avoidance. Congestion control approaches are, at present, rarely proactive, and utilities react to congestion using after-the-fact mechanisms such as re-dispatch and controlling line flows by using phase-shifting transformers. Utilities approach unknown future congestion by simply oversizing conductors which is not economical. Power companies do not adopt proactive congestion management for many reasons including:
1. simulations require accurate internal and external network models and wide-range of scenarios which are rarely available, expensive to create, and computationally expensive;
2. planning approaches using AC power flow with Monte-Carlo simulation adopt high dimensional models and are computationally inefficient, thus rendering them inefficient for real-time congestion forecasting;
3. presence of renewable energy generation exacerbates problem;
4. bottlenecks often exist on external network models and acquisition of hyperlocal weather forecast information; and/or
5. data-only approaches that use line-flow forecasts trained on only historical measurements are not accurate due to overfitting on available features and the absence of the capability to process network topology.

SUMMARY

An example nontransitory computer readable medium comprises executable instructions, the executable instructions being executable by one or more processors to perform a method, the method comprising receiving first historical data of a first time period and failure data of the first time period, the historical data including sensor data from one or more sensors of a renewable energy asset, the failure data indicating at least one first failure associated with the renewable energy asset during the first time period, identifying at least some sensor data of the first historical data that was or potentially was generated during the first failure indicated by the failure data, removing the at least some sensor data from the first historical data to create filtered historical data, training a classification model using the filtered historical data, the classification model indicating at least one first classified state of the renewable energy asset at a second period of time prior to the first failure indicated by the failure data, applying the classification model to second sensor data to identify a first potential failure state based on the at least one first classified state, the second sensor data being from the one or more sensors of the renewable energy asset during a subsequent time period after the first time period, generating an alert if the first potential failure state is identified based on at least a first subset of sensor signals generated during the subsequent time period, and providing the alert.

The renewable energy asset may be a wind turbine or a solar panel. The one classified state of the renewable energy asset may be based on a subset of sensor readings generated prior to the failure and not all of the sensor readings of the first historical data generated prior to the failure. In some embodiments, the second period of time is a desired number of days before a predicted failure associated with the first potential failure state. The alert may be provided at the desired number of days.

In some embodiments, the method may further comprise training a classification model using the filtered historical data, the classification model indicating at least one second classified state of the renewable energy asset at the second period of time prior to a third failure indicated by the failure data, applying the classification model to second sensor data to identify a second potential failure state based on the at least one second classified state, the second sensor data being from the one or more sensors of the renewable energy asset during the subsequent time period after the first time period, wherein the first potential failure state is associated with a failure of a first component of the renewable energy asset and the second potential failure state is associated with a failure of a second component of the renewable energy asset, and generating an alert if the second potential failure state is identified based on at least a second subset of sensor signals generated during the subsequent time period, the first subset of sensor signals not including at least one sensor signal of the second subset of sensor signals.

In various embodiments, identifying the at least some sensor data of the first historical data that was or potentially was generated during the first failure indicated by the failure data comprises scanning at least some of the first historical data and comparing at least some of the sensor data of the first historical data to a failure threshold to identify at least some of the sensor data that was or potentially was generated during the first failure. Identifying the at least some sensor data of the first historical data that was or potentially was generated during the first failure indicated by the failure data may comprise identifying an amount of downtime based on the failure data, scanning at least some of the first historical data, and comparing at least some of the sensor data of the first historical data to a failure threshold to identify at least some of the sensor data that was or potentially was generated during the first failure until the amount of sensor data identified as failure or potentially as failure based on the comparison is at least equal to the amount of downtime, wherein removing the at least some sensor data comprises removing the sensor data that was or potentially was generated during the first failure.

The method may further comprise generating a probability score based on a probability of the second sensor data fitting into the at least one classified state, wherein generating the alert comprises comparing the probability score to a threshold score. Providing the alert may comprise providing a message indicating at least one component associated with the second sensor data may potentially fail.

An example system may comprise at least one processor and memory containing instructions, the instructions being executable by the at least one processor to: receive first historical data of a first time period and failure data of the first time period, the historical data including sensor data from one or more sensors of a renewable energy asset, the failure data indicating at least one first failure associated with the renewable energy asset during the first time period, identify at least some sensor data of the first historical data that was or potentially was generated during the first failure indicated by the failure data, remove the at least some sensor data from the first historical data to create filtered historical data, train a classification model using the filtered historical data, the classification model indicating at least one first classified state of the renewable energy asset at a second period of time prior to the first failure indicated by the failure data, apply the classification model to second sensor data to identify a first potential failure state based on the at least one first classified state, the second sensor data being from the one or more sensors of the renewable energy asset during a subsequent time period after the first time period, generate an alert if the first potential failure state is identified based on at least a first subset of sensor signals generated during the subsequent time period, and provide the alert.

An example method may comprise receiving first historical data of a first time period and failure data of the first time period, the historical data including sensor data from one or more sensors of a renewable energy asset, the failure data indicating at least one first failure associated with the renewable energy asset during the first time period, identifying at least some sensor data of the first historical data that was or potentially was generated during the first failure indicated by the failure data, removing the at least some sensor data from the first historical data to create filtered historical data, training a classification model using the filtered historical data, the classification model indicating at least one first classified state of the renewable energy asset at a second period of time prior to the first failure indicated by the failure data, applying the classification model to second sensor data to identify a first potential failure state based on the at least one first classified state, the second sensor data being from the one or more sensors of the renewable energy asset during a subsequent time period after the first time period, generating an alert if the first potential failure state is identified based on at least a first subset of sensor signals generated during the subsequent time period, and providing the alert.

DETAILED DESCRIPTION

In wind and solar generation industry, it may be crucial to forecast component failures with lead time. Some embodiments described herein utilize machine learning algorithms to build a sophisticated forecasting model based on multivariate sensor data to forecast component failures. In various embodiments, systems and methods described herein overcome limitations of the prior art including scalability, proactive warnings, and computational efficiency while providing improved accuracy.

Historically, various operational anomalies and historical failures, make model training difficult leading to inaccuracy in modeling. Some embodiments focus on a foundational method which define and scope input data for a particular type of failure forecasting problem. Based on input data, such as a given set of sensor data, systems discussed herein may predict a component failure with a desired lead time. In various embodiments, the methods and systems disclosed herein overcomes previously existing models that overly weighted data at the time of failure in creating models which leads to inaccuracy and unpredictability. Systems and methods described herein may correct the problem generated by the previous application of modeling and provides lead time to enable corrective action to take place prior to failure.

Figure 1:
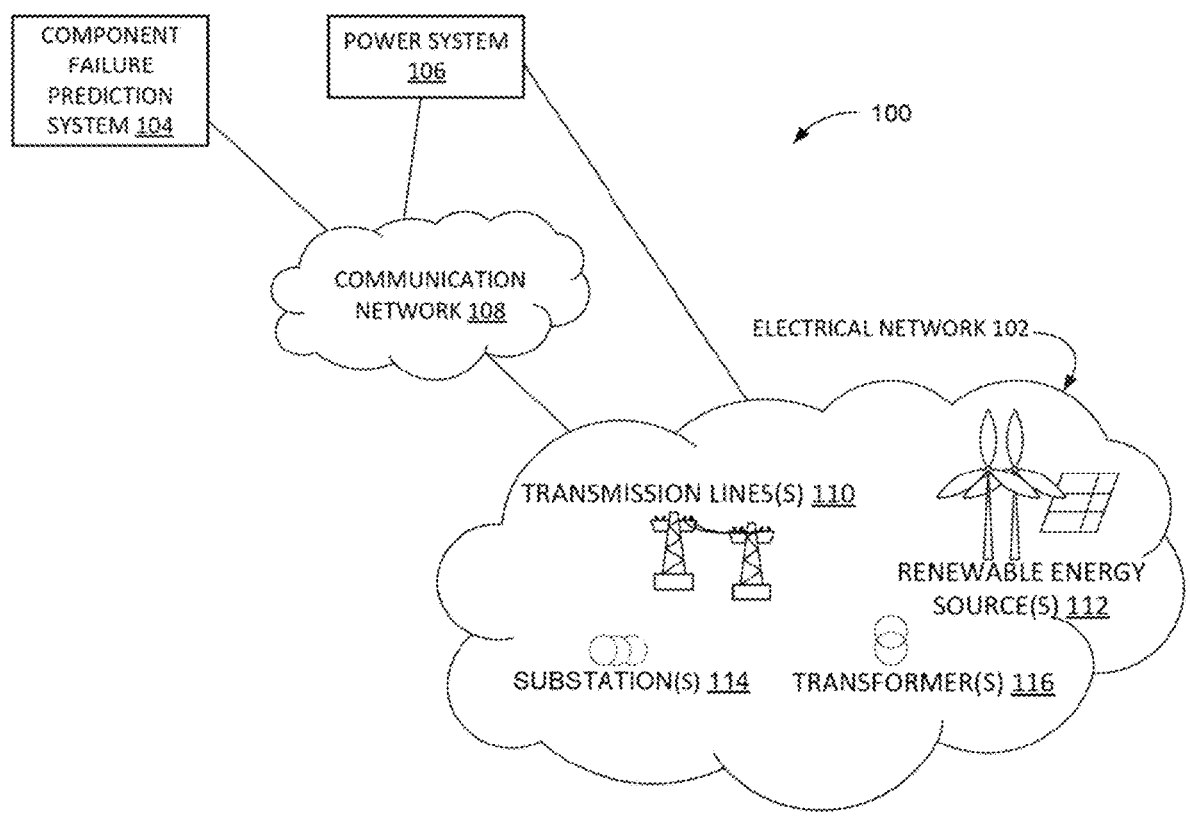
FIG. 1 depicts a block diagram of an example of an electrical network in some embodiments.

FIG. 1 depicts a block diagram 100 of an example of an electrical network 100 in some embodiments. FIG. 1 includes an electrical network 102, a component failure prediction system 104, a power system 106, in communication over a communication network 108. The electrical network 102 includes any number of transmission lines 110, renewable energy sources 112, substations 114, and transformers 116. The electrical network 102 may include any number of electrical assets including protective assets (e.g., relays or other circuits to protect one or more assets), transmission assets (e.g., lines, or devices for delivering or receiving power), and/or loads (e.g., residential houses, commercial businesses, and/or the like).

Components of the electrical network 102 such as the transmission line(s) 110, the renewable energy source(s) 112, substation(s) 114, and/or transformer(s) 106 may inject energy or power (or assist in the injection of energy or power) into the electrical network 102. Each component of the electrical network 102 may be represented by any number of nodes in a network representation of the electrical network. Renewable energy sources 112 may include solar panels, wind turbines, and/or other forms of so called "green energy." The electrical network 102 may include a wide electrical network grid (e.g., with 40,000 assets or more).

Each component of the electrical network 100 may represent one or more elements of their respective components. For example, the transformer(s) 116, as shown in FIG. 1 may represent any number of transformers which make up electrical network 100.

In some embodiments, the congestion mitigation system 104 provides real-time congestion-forecasting on any number of path(s) (or path equivalents) of the electrical network 102 to the power system 106. The congestion mitigation system 104 may identify a bus, path, and/or combination of assets of the electrical network 102 which have a significant influence on congestion as a path of interest. In various embodiments, the congestion mitigation system 104 may compute power flow on the identified bus, path, and/or combination of assets of the electrical network 102. The congestion mitigation system 104 may compare the computed power flow to thresholds (e.g., which may be pre-set by the power system 106) to assist in forecasting congestions.

In some embodiments, communication network 108 represents one or more computer networks (e.g., LAN, WAN, and/or the like). Communication network 108 may provide communication between any of the congestion mitigation system 104, the power system 106, and/or the electrical network 102. In some implementations, communication network 108 comprises computer devices, routers, cables, uses, and/or other network topologies. In some embodiments, communication network 108 may be wired and/or wireless. In various embodiments, communication network 108 may comprise the Internet, one or more networks that may be public, private, IP-based, non-IP based, and so forth.

The component failure prediction system 104 may include any number of digital devices configured to forecast component failure of any number of components and/or generators (e.g., wind turbine or solar power generator) of the renewable energy sources 112.

In various embodiments, the component failure prediction system 104 may reduce computational burden of forecasting failure of any number of components and/or generators by applying machine learning tools on historical data after the historical data has been scoped to remove overfitting or other overly weighting features.

Using scoped historical data of component and/or device failure to forecast failure, the component failure prediction system 104 may forecast failure up through the next 3 hours, 6 hours, 8 hours, 12 hours, 16 hours, 20 hours, 24 hours, 28 hours, 32 hours, 36 hours, 40 hours, 44 hours, 48 hours, or more. It will be appreciated that the system is not limited to forecasting only the examples above, but may be any amount of time.

The power system 106 may include any number of digital devices configured to control distribution and/or transmission of energy. The power system 106 may, in one example, be controlled by a power company, utility, and/or the like. A digital device is any device with at least one processor and memory. Examples of systems, environments, and/or configurations that may be suitable for use with system include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

A computer system may be described in the general context of computer system executable instructions, such as program modules, being executed by a computer system. Generally, program modules may include routines, programs, objects, components, logic, data structures, and so on that perform particular tasks or implement particular abstract data types. A digital device, such as a computer system, is further described with regard to FIG. 13.

Figure 2:
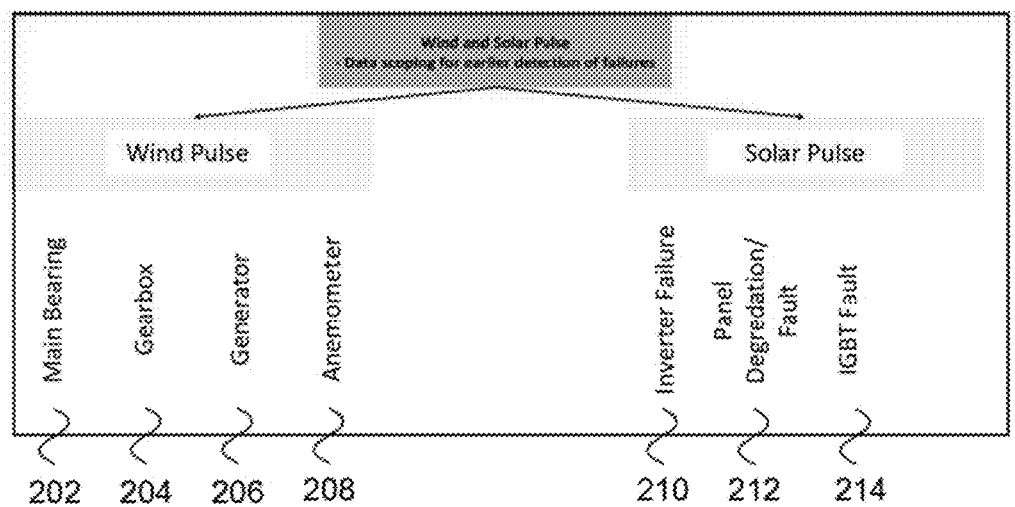
FIG. 2 depicts components that often produce failures of wind turbines and components that often produce failures in solar panel generators.

FIG. 2 depicts components that often produce failures of wind turbines and components that often produce failures in solar panel generators. Failures in wind turbines often occur as a result of failures in a main bearing 202, gearbox 204, generator 206, or anemometer 208. Failures in solar panel generators often occur as a result of failures in an inverter 210, panel degradation 212, and an IGBT 214.

A wind turbine has many potential components of failure. Different sensors may provide different readings for one or more different components or combinations of components. Given the number of wind turbines in a wind farm, the amount of data to be assessed may be untenable using prior art methods. For example, data analytics systems of the prior art do not scale, sensors provide too much data to be assessed by the prior art systems, and there is a lack of computational capacity in prior art systems to effectively assess data from wind farms in a time sensitive manner. As a result, prior art systems are reactive to existing failures rather than proactively providing reports or warnings of potential future failure of one or more components.

For example, various embodiments regarding a wind turbine described herein may identify potential failure of a main bearing 202, gearbox 204, generator 206, or anemometer 208 of one or more wind turbines. Although many bearings may be utilized in a wind turbine (e.g., yaw and pitch bearings), the main shaft and gearbox of the wind turbine tend to be the most problematic. For example, a main bearing 202 may fail due to high thrust load or may fail due to inadequate lubricant film generation. Trends in redesign of a main shaft 202 and/or gearbox 204 of a single wind turbine have been driven by unexpected failures in these units. The unplanned replacement of main-shaft bearing 202 can cost operators up to $450,000 and have an obvious impact on financial performance.

Gearbox 204 failures are one of the largest sources of unplanned maintenance costs. Gearbox 204 failures can be caused by design issues, manufacturing defects, deficiencies in the lubricant, excessive time at standstill, high loading, and other reasons. There may be many different modes of gearbox 204 failure and, as such, it may be important to identify the type of failure mode in addressing the failure. One mode is micropitting which occurs when lubricant film between contacting surfaces in a gearbox 204 is not thick enough. Macropitting occurs when contact stress in a gear or breaking exceeds the fatigue strength of the material. Bending fatigue a failure mode that affects gear teeth and axial cracking may occur in bearings of a gearbox; the cracks develop in the axial direction, perpendicular to the direction of rolling.

The generator 206 typically converts the wind energy to electrical energy. Failures often occur in bearings, stator, rotor, or the like which can lead to inconsistent voltage to total failure. Generator 206 failure may be difficult to detect as a result of inconsistent weather, lack of motion, and/or partial failure of the anemometer 208.

The anemometer 208 uses moving parts as sensors. Anemometers 208 often include "cups" for wind speed measurements and a wind vane that uses a "vane tail" for measuring vector change, or wind direction. Freezing weather has caused the "cups" and "vane tail" to lock. If an anemometer 208 under-reports wind speed because of a partial failure, there is an increase in rotor acceleration that indicates a large amount of wind energy is not converted into electrical engineering. Rolling resistance in an anemometer 208 bearings typically increase over time until they seize. Further, if the anemometer 208 is not accurate, the wind turbine will not control blade pitch and rotor speed as needed. Poor or inaccurate measurements by the anemometer 208 will lead to incorrect adjustments and increased fatigue.

Similarly, various embodiments regarding a solar panel generator described herein may identify potential failure of a inverter 210, solar panel 212, and IGBT 214 in one or more solar panels of a solar farm.

A solar inverter 210 is an electrical converter to convert variable direct current from a photovoltaic solar panel 212 into a utility frequency alternating current that can be fed to an electrical grid. Production loses are often attributable to poor performance of inverters 210. Solar inventers 210 may overheat (caused by weather, use, or failure of cooling systems) which can reduce production. Moisture may cause a short circuit which can cause complete or partial failure (e.g., to a minimum "required" isolation level). Further, failure of the solar inverter 210 to restart after gird fault may require manual restarting of the equipment.

The panel 212 refers to the solar or photovoltaic panel. The photovoltaic panel 212 may degrade due to weather, poor cleaning, thermal cycling, damp heat, humidity freezing, and UV exposure. Thermal cycling can cause solder bond failures and cracks. Damp heat has been associated with delamination of encapsulants and corrosion of cells. Humidity freezing can cause junction box adhesion to fail. UV exposure contributes to discoloration and backsheet degradation.

Solar inverters 210 often use insulated gate bipolar transistors (IGBT) 214 for conversion of solar panel 212 output to AC voltage. Failures in the IGBT 214 can be caused by fatigue, corrosion of metallizations, electromigration of metalizations, conductive filament formation, stress driven diffusion voiding, and time dependent dielectric breakdown.

Figure 3:
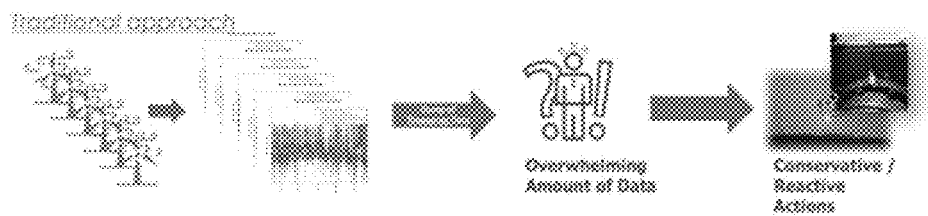
FIG. 3 depicts a common problem of detecting possible failure of one or more components of a wind farm.

FIG. 3 depicts a common problem of detecting possible failure of one or more components of a wind farm. As shown in FIG. 3, there may be any number of wind turbines in a wind farm. Sensors of each wind turbine in a wind farm may generate its own data. As a result, there is a dump of timeseries data which is overwhelming for prior art systems and prior art methods of assessment. As illustrated, monitoring hundreds of assets with hundreds of sensor inputs is time-consuming and overwhelming for operators to test. Existing prior art systems receive too much timeseries data to be effectively assessed in a scalable and/or computationally efficient manner. As a result, there is a conservative and or reactive response to component and wind turbine failure. In other words, action is typically taken well after failure is detected or when failure is both immanent and unmistakable.

Figure 4:
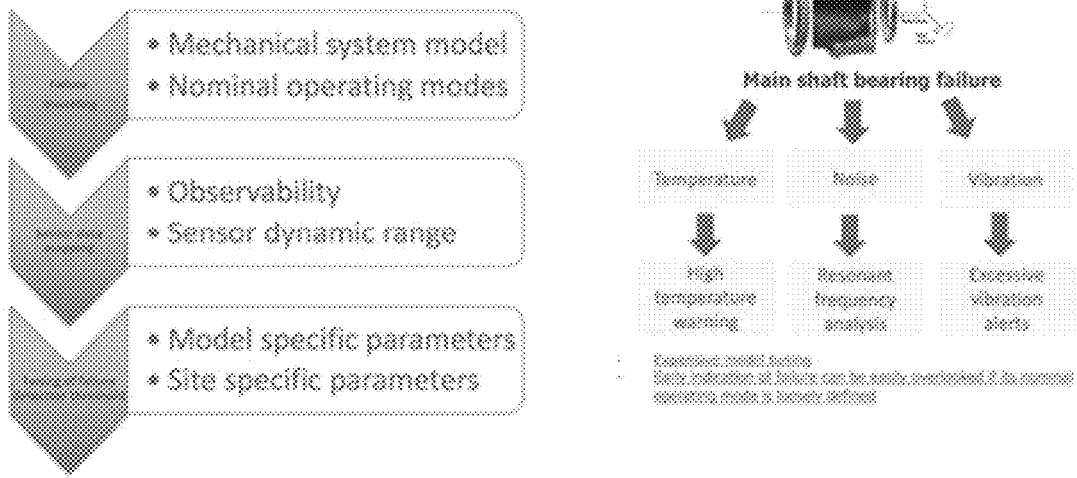
FIG. 4 depicts traditional failure prediction approaches of main shaft bearing failure in wind turbines as well as challenges.

FIG. 4 depicts traditional failure prediction approaches of main shaft bearing failure in wind turbines as well as challenges. In this example, main shaft bearing failure may be caused by any number of components. For prior art analysis, challenges include identifying the correct mechanical systems model and nominal operating modes of that mechanical system model.

Prior art approaches may also fail due to incorrect sensor data mapping. Mapping of sensor data may be based on observability and take into account sensor dynamic range. In this example of the main shaft bearing failure, sensor data regarding temperature, noise, and/or vibration may be taken into account. For example, the sensor data related to temperature, noise, and/or vibration is observed against the background of other sensor data readings, and the sensor dynamic range of each individual sensor or combination of sensors should be recognized.

Prior art systems often fail in tuning a failure detection threshold for a sensor reading. Prior art systems typically must identify model specific parameters and site-specific parameters. In this case the temperature sensor data may indicate a high temperature warning relative to some high temperature threshold. The noise data may be utilized for resonant frequency analysis to detect residents within a component or device. The vibration data may be assessed to determine excessive vibration relative to some vibration threshold.

Further early indication of failures in temperature, noise, vibration, or other failures, can be easily overlooked if it's nominal operating mode is loosely defined by the prior art system.

Figure 5:
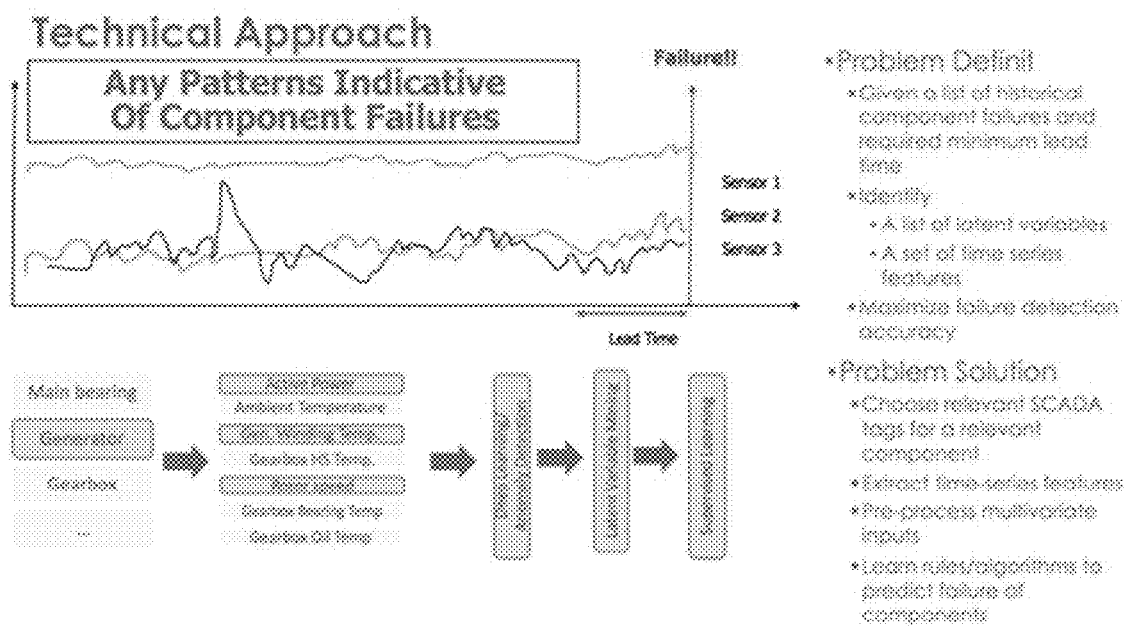
FIG. 5 characterizes problems and propose solutions in some.

FIG. 5 characterizes problems and propose solutions in some embodiments. The graph in FIG. 5 depicts sensor readings from multiple sensors over a period of time leading up to failure. The time before the failure is indicated as "lead time." One goal is to improve lead time such that alerts may be issued and/or actions taken to mitigate consequences of failure or avoid failure prior to that failure occurring.

In this example, the three sensors with sensor readings indicated in the graph are part of a generator of the wind turbine. Each of the three sensors include an active power sensor, a generator winding temperature sensor, and a rotor speed sensor. It will be appreciated that there may be any number of sensors provide any number of data. A subset of sensor readings may indicate a failure while the other sensors may not provide data related to the failure. As a result, in some embodiments, systems and methods described herein may identify subsets of sensor readings (from a much larger set of sensor readings) that identify possible failure conditions.

Some embodiments of systems and methods described herein address a problem of providing warnings a possible failure data before a minimum lead time given a list of historical component failures and readings from sensors of a number of renewable energy devices (e.g., wind turbines of a wind farm and or solar panel generators of a solar farm). Those systems and methods described herein may identify a list of latent variables, and a set of timeseries features and may maximize (or improve) failure detection accuracy.

In some embodiments, systems and methods described herein may choose relevant SCADA (supervisory control and data acquisition) tags for one or more relevant components. The systems may extract timeseries features and preset process multivariate inputs. Based on all or some of the foregoing, the system may learn rules (e.g., algorithms) to predict failure of components.

Failure of systems and/or components after a gradual degradation of one or more components may be very difficult to detect. Given time, historical data may normalize to the degraded performance of those components thereby making detection of ultimate failure more difficult. Further, in the prior art systems, overwhelming amounts of data from any number of components from any number of devices of a wind or solar farm may make gradual changes in performance or sensor readings difficult to detect. In some embodiments, systems and methods described herein may proactively predict failure of components or systems that have gradual degradation.

In various embodiments, systems and methods described herein may receive sensor information from active power sensors, generator winding temperature sensors, and rotor speed sensor, apply deep learning for anomaly detection, mine latent variables from the data after deep learning, and apply supervised learning to the results to generate a model for future systems. Example systems are discussed herein.

Figure 6:
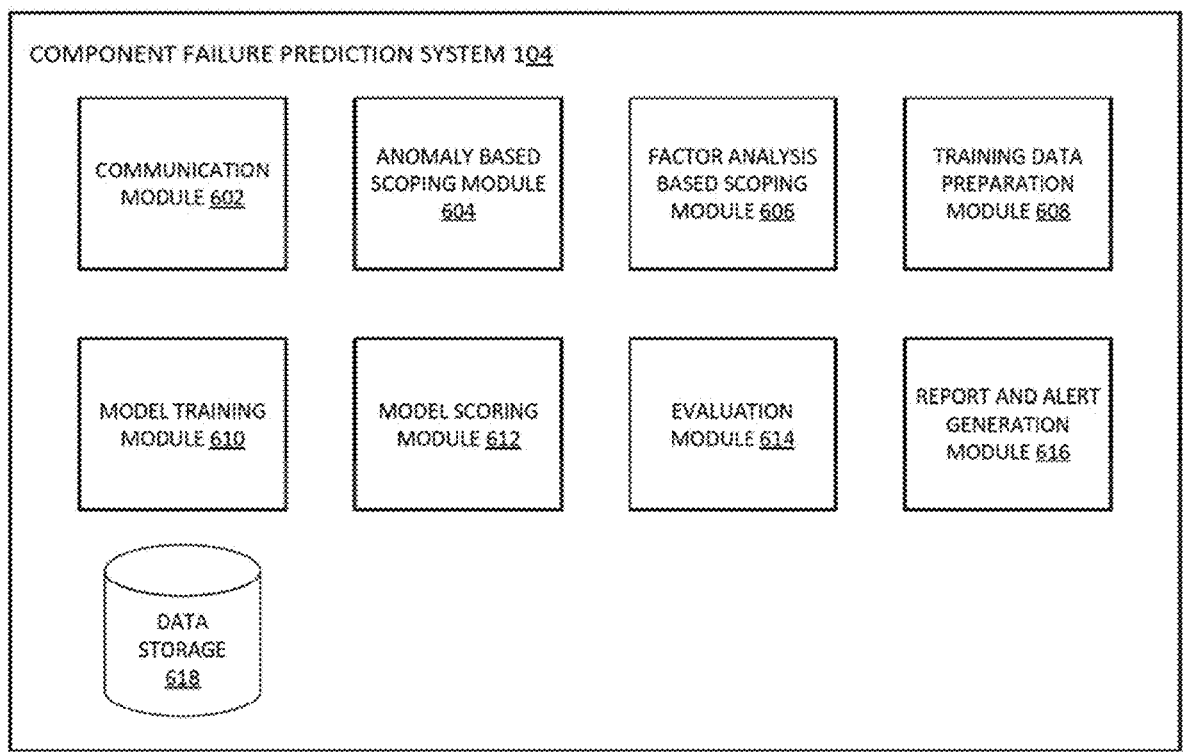
FIG. 6 is a block diagram of a component failure prediction system in some embodiments.

FIG. 6 is a block diagram of a component failure prediction system 104 in some embodiments. The component failure prediction system 104 may predict a component failure ahead of the actual failure. The component failure production system 104 may, in some embodiments, apply a multi-variate anomaly detection algorithm to sensors that are monitoring operating conditions of any number of renewable assets (e.g., wind turbines and or solar generators). The component failure production system 104 may remove data associated with a past, actual failure of the system (e.g. of any number of components and or devices), therefore highlighting subtle anomalies from normal operational conditions that lead to actual failures.

The component failure production system 104 may fine-tune the model by applying dimensionality reduction techniques to remove noise from irrelevant sensor data (e.g., apply principal component analysis to generate a model using linearly uncorrelated data and/or features from the data). For example, the component failure production system 104 may utilize factor analysis to identify the importance of features within the data. The component failure production system 104 may also utilize or more weighting vectors to highlight a portion or subset of sensor data that has high impact on the failure.

In some embodiments, the component failure production system 104 may further scope the time series data by removing sensor data from the actual failure time period. In various embodiments, the component failure production system 104 may optionally utilize curated data features to improve the accuracy of detection. Gearbox failure detection, for example, may utilize temperature rise in the gearbox with regards to power generation, reactive power, and ambient temperature.

The component failure production system 104 may utilize a set of classification algorithms based on features that are fed from the raw sensor data, derived features, anomaly score, and fault score. The fault score can be computed based on the dimensionality reduction technique such as PCA and ICA. The Anomaly score can be computed based on multi-variate anomaly detection.

Figure 7:
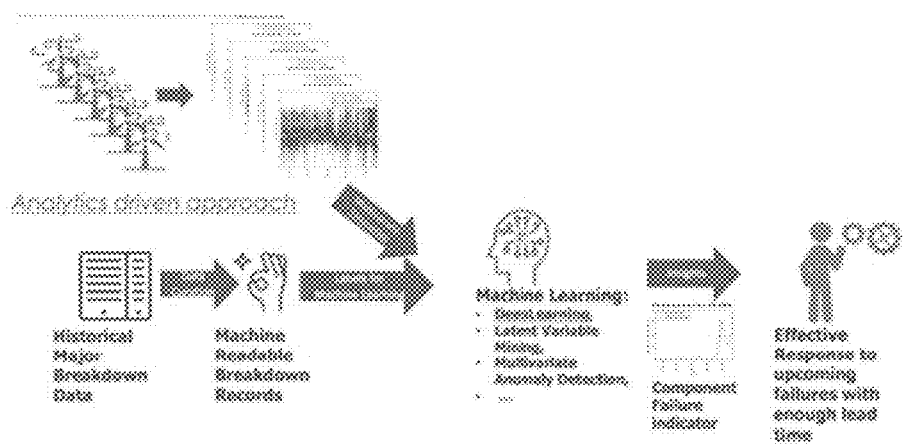
FIG. 7 describes an analytics driven approach that may be utilized by the component failure prediction system in some embodiments.

FIG. 7 describes an analytics driven approach that may be utilized by the component failure prediction system 104 in some embodiments. In some embodiments, the component failure prediction system 104 may receive historical data regarding renewable energy sources (e.g., wind turbines, solar panels, wind farms, solar farms, electrical grants, and/or the like). The component failure prediction system 104 may break down the data in order to identify important features and remove noise of past failures that may impact model building. The historical data may be curated to further identify important features and remove noise. The component failure prediction system 104 may further identify labels or categories for machine learning. It will be appreciated that component failure prediction system 104 may, in some embodiments, identify labels for machine learning with or without data generation from other sources.

The component failure prediction system 104 may receive sensor data regarding any number of components from any number of devices, such as wind turbines from a wind farm. The multivariate timeseries data in combination with the labels or categories for machine learning, may assist for deep learning, latent variable mining, multivariate anomaly detection to assist and provide insights for component failure indication. These insights, which may predict upcoming failures, may effectively enable responses to upcoming failures with sufficient lead time before failure impacts other components of energy generation.

It will be appreciated that identifying upcoming failures for any number of components and renewable energy generation may become increasingly important as sources of energy migrate to renewable energy. Failure of one or more components may impact the grid significantly, and as a result may put the electrical grid, or the legacy components of the electrical grid, either under burden or cause them to fail completely. Further, failures of the electrical grid and/or failures of renewable energy sources may threaten loss of property, business, or life particularly at times where energy is critical (e.g., hospital systems, severe weather conditions such as heat waves, blizzards, or hurricanes, care for the sick, care for the elderly, and/or care of the young).

The component failure prediction system 104 may comprise the communication module 602, an anomaly based scoping module 604, a factor analysis based scoping module 606, a training data preparation module 608, a model training module 610, a model scoring module 612, an evaluation module 614, and a report and alert generation module 616. The component failure prediction system 104 may further comprise data storage 618.

The communication module 602 may be configured to transmit and receive data between two or more modules in component failure prediction system 104. In some embodiments, the communication module 602 is configured to receive information regarding assets of the electrical network 102 (e.g., from the power system 106, sensors within components of the electrical network 102 such as the renewable energy sources 112, third-party systems such as government entities, other utilities, and/or the like).

The communication module 602 may be configured to receive historical data regarding electrical assets either individually or in combination (e.g., wind turbines, solar panels, windfarms, solar farms, components of devices, components of wind turbines, components of solar panels, substations 114, transformers 116, and/or transmission lines 110). The communication module 602 may further receive sensor data from one or more sensors of any number of electrical assets such as those described above.

The anomaly based scoping module 604 may receive historical data including sensor data from any number of sensors of renewable energy assets. The sensor data may be from any number of sensors over a predetermined period of time. In some embodiments, the anomaly based scoping module 604 normalizes and extracts derived features from that sensor data. In one example, such features may include a ratio between active power and windspeed measurement or temperature difference between a control room and ambient temperatures.

The anomaly based scoping module 604 may receive any amount of historical data regarding any number of wind turbines and/or wind turbine farms. In one example, the historical data may include sensor data from any number of wind turbines in a wind farm over a length of time (e.g., over one year). In another example historical data may include sensor data from any number of wind turbines any number of windfarms over different lengths of time.

The sensor data may be from any number of sensor including sensors that measure different conditions. For example, the sensor data may include data from main bearing sensors, generator sensors, vibration sensors, anemometer sensors, and the like.

The anomaly based scoping module 604 may remove anomaly data points from a list of prior failure events during the time to perform 1st level data scoping. For example, the anomaly based scoping module 604 may receive historical data including sensor data of a wind farm that extends through a first time period as well as failure data that indicates failures within the wind farm within that first time period. In some embodiments, if the failure data indicates the type of failure, time of failure, and the specific turbine(s) and/or type of failures, the anomaly based scoping module 604 may remove the historical data of that failure from the historical data. For example, the anomaly based scoping module 604 may remove sensor data from the historical data of sensors linked to the failure (e.g., of the failing wind turbine and/or failing components of the wind turbine) from the time the failure was detected through to the time that failure correction was determined or detected.

The anomaly based scoping module 604 may subsequently rerun the multivariate anomaly model to set a second layer baseline to perform primary unsupervised learning. The anomaly based scoping module 604 may subsequently store multivariate timeseries data along with anomaly status for a predetermined period of the time when failures are excluded. The anomaly based scoping module 604 may store the multivariate timeseries data within the data storage 618.

In various embodiments, the anomaly based scoping module 604 may generate different models for different types of failures.

The anomaly based scoping module 604 may train a multivariate anomaly model (e.g., such as an isolation forest or random forest) to set a baseline for initial unsupervised learning.

The factor analysis based scoping module 606 may run a factor analysis of a combination of previous features to extract secondary data. The factor analysis based scoping module 606 can identify the top factors (e.g., most significant factors relative to other factors) that contribute into the historical failure of data. As a result, the factor analysis based scoping module 606 may create a weighting vector for high importance for particular modes of failures. The factor analysis based scoping module 606 may perform initial scoping of sensor variable values by applying the weight vector.

The factor analysis based scoping module 606 may apply the weighting vector on some input sensor data of the historical data. The anomaly based scoping module 604 may exclude the time period from the list of actual failure data for primary scoping of the data.

The training data preparation module 608 may build a predictive model based on the second layer baseline from the anomaly based scoping module 604 and the primary scoping of data from the factor analysis based scoping module 606. In some embodiments training data is prepared as a tuple of anomaly score timeseries, fault score timeseries, an indicator variable showing particular mode of fault that occurred in the desired time period (e.g., 45 day lead time).

The model training module 610 may utilize classification algorithms for model training. The classifications may include for example SVM, DeepLearning (such as CNN or CHAID). The training model input may include balanced input such as, for example, scoped anomaly time series, scoped weighted sensor timeseries, and failure indications. In some embodiments the timeseries data is a matrix where the start time the end time of the timeseries include maximum lead time, minimum lead time, and per desired time horizon (e.g., 45 days to 10 days before an event).

In some embodiments, the balanced input may require a minimum of failure history (e.g., 20%) which can be copied by subsampling the non-failure history and by boosting the failure history data (e.g., sliding window for the failure history data).

The model scoring module 612 may provide a probability of failure within the predefined lead time interval using the second layer baseline from the anomaly based scoping module 604, the primary scoping of data from the factor analysis based scoping module 606, and inputting the tuple of scoped anomaly timeseries, scoped weighted timeseries, and failure indication.

The model scoring module 612 may provide a probability of failure within the predefined lead time interval.

Further computation of the failure can be accomplished by counting down the time from the first date of the failure prediction.

The evaluation module 614 may be configured to apply a model generated by the model training module 610 to sensor data received from the same wind turbine or renewable asset equipment that was used to produce the sensor data of the previous received historical data. In various embodiments, the evaluation module 614 may compare new sensor data to classified and/or categorized states identified by the model of the model training module 610 to identify when sensor data indicates a failure state or a state associated with potential failure is reached. In some embodiments, the evaluation module 614 may score the likelihood or confidence of such estate being reached. The evaluation module 614 may compare the confidence or score against a threshold in order to trigger an alert or report. In another example, the evaluation module 614 may compare the fit of sensor data to a failure state or state associate with potential failure that has been identified by the model of the model training module 610 in order to trigger or not trigger an alert or report. Further examples are discussed regarding FIG. 8.

It will be appreciated that there may be different categorized states identified during model training. Each categorized state may be associated with a different type of failure including mode of failure, component of failure, and/or the like.

The report and alert generation module 616 may generate an alert based on the evaluation of the evaluation module 614. An alert may be a message indicating a failure or type of failure as well as the specific renewable energy asset (e.g., wind turbine or solar panel) that may be at risk of failure. Since the state identified by the model is a state that is in advance of a potential failure, the alert should be triggered in advance of the potential failure such that corrective action may take place. In some embodiments, different alerts may be generated based on different possible failure and or different failure states. For example, some failure states may be more serious than others, as such more alerts and/or additional detailed alerts may be provided to a larger number of digital devices (e.g., cell phones, operators, utility companies, service computers, or the like) depending on the seriousness, significance, and/or imminence of failure.

In some embodiments, the report and alert generation module 616 may generate a report indicating any number of potential failures, the probability of such failure, and the justification or reasoning based on the model and the fit of previously identified states associated with future failure of components.

The data storage 618 may be any type of data storage including tables databases or the like. The data store 618 may store models, historical data, current sensor data, states indicating possible future failure, alerts, reports, and/or the like.

A module may be hardware (e.g., circuitry and/or programmable chip), software, or a combination of hardware and software.

Figure 8:
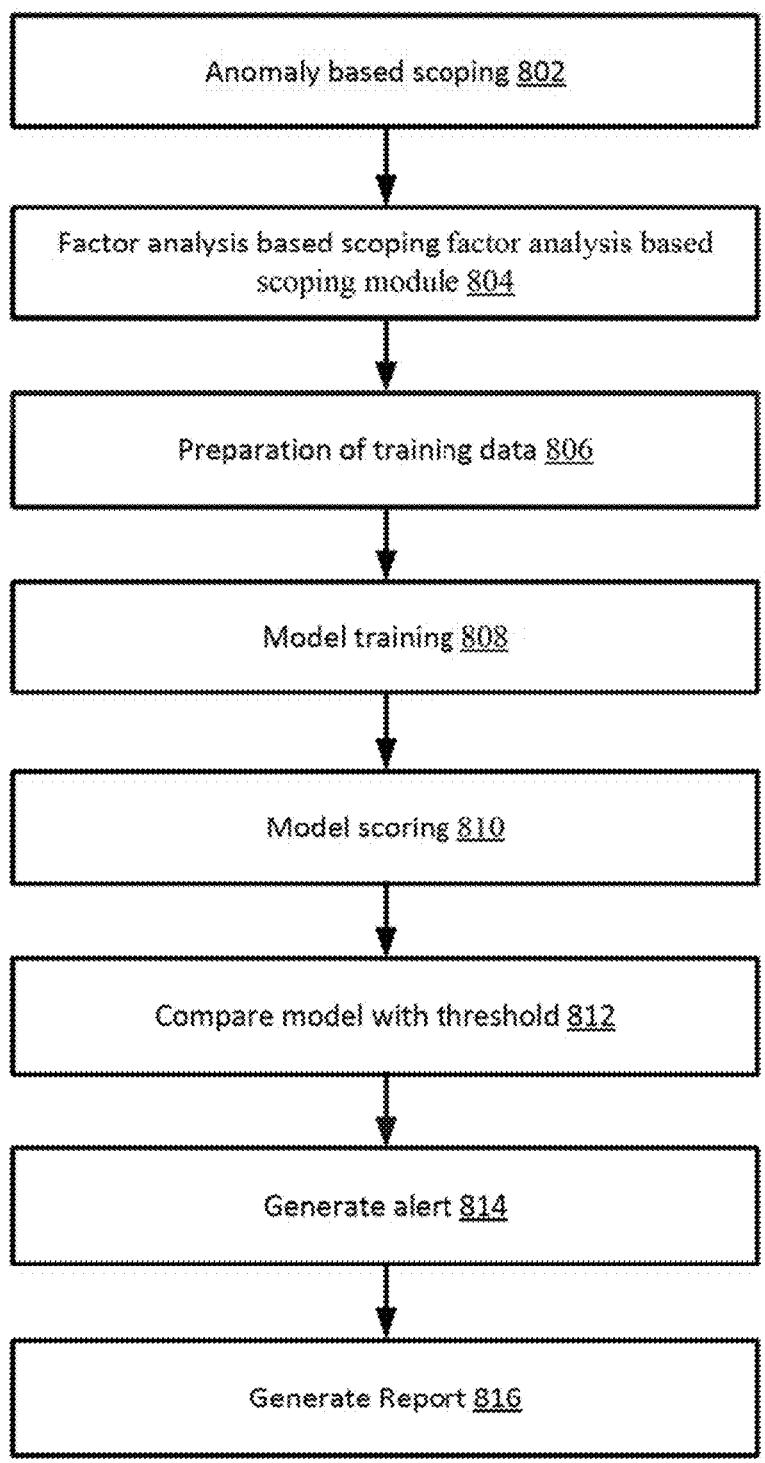
FIG. 8 is a flowchart for predicting failures and/or potential failures of renewable energy assets.

FIG. 8 is a flowchart for predicting failures and/or potential failures of renewable energy assets. In the example of FIG. 8, prediction failures and/or potential failures of wind turbines is discussed. In step 802, the anomaly based scoping module 604 performs anomaly based scoping on historical data regarding a wind farm. For example, the anomaly based scoping module 604 may receive historical data including sensor data from any number of sensors of any number of wind turbines in the wind farm over a first period of time. Subsequently, the anomaly based scoping module 604 may filter out sensor data generated during a known failure or generated during a statistical likelihood of failure.

In some embodiments, the anomaly based scoping module 604 may receive historical data generated by sensors during the first period of time and failure data indicating failures during that first period of time. The historical data may include sensor data regarding any number of components of any number of wind turbines. The historical data may be received from any number of sources including, for example, an operator of a wind farm, utility, manufacturer, surface provider, or the like. Similarly, the failure data may be received from any number of sources including, for example, an operator of a wind farm, utility, manufacturer, surface provider, or the like. All or some of the historical data may be from the same sources or different sources that provide the failure data. In some embodiments, all or some of the sensor data of the historical data may be receive from any number of sensors and/or a sensor aggregator.

The failure data may include different data indicating failure. In some embodiments, the failure data may only include a percentage of downtime during the first period of time of one or more wind turbines. In other embodiments, the failure data may include additional information or different information including, for example, indications when specific wind turbines failed and/or the type of component that failed (e.g., generator failure).

If the failure data indicates the time of failure and the specific wind turbines( ) that failed but not the type of failure (e.g., a type of failure condition or specific component that failed), the anomaly based scoping module 604 may remove and/or filter sensor data generated by sensors of that particular specific wind turbine during the period of the detected failure. If the failure data indicates the time of failure, the specific wind turbine(s) that failed, and the type of failure, the anomaly based scoping module 604 may remove and/or filter sensor data generated by sensors related to that specific type of failure (e.g., generator sensor data during a time of a generator fault of a particular wind turbine) of the particular specific wind turbine during the period of the detected failure. Additionally, in some embodiments, the anomaly based scoping module 604 may remove and/or filter sensor data generated by sensors of components that may be impacted by the failure (e.g., vibration sensor data may be removed if the wind turbine blades stopped moving due to a bearing failure).

In various embodiments, the failure data only indicates a percentage or amount of downtime of the wind farm and/or any number of wind turbines during the first period of time of the historical data. The anomaly based scoping module 604 may review the data for sensor data indicating failures and possible failures. The anomaly based scoping module 604 may identify the strongest sensor data indicating failures of components and/or turbines in the historical data. In one example, the anomaly based scoping module 604 may compare different sensor data of different components to different component thresholds (e.g., data from generator sensors is compared against a generator failure threshold to determine failure).

In some embodiments, the anomaly based scoping module 604 tracks an amount of time where failure (e.g., failure or potential failure) is detected in the sensor data of the historical period. If the amount of time where failure is detected in the sensor data of the historical period is equal to the amount of time/percentage of time identified in the failure data, then the anomaly based scoping module 604 may remove that particular sensor data from the historical data. If the amount of time where failure (e.g., failure or potential failure) is detected in the sensor data is more than the amount of time/percentage of time identified in the failure data, then the anomaly based scoping module 604 may remove, from the historical data, sensor data that includes the strongest indications of failure relative to the other sensor data until the amount of time or percentage of amount of time of the first period of time is satisfied. If the amount of time where failure (e.g., failure or potential failure) is detected in the sensor data is less than the amount of time/percentage of time identified in the failure data, then the anomaly based scoping module 604 may identify additional sensor data from the historical data (e.g., compare against higher thresholds) to remove until the amount of time or percentage of amount of time of the first period of time is satisfied.

It will be appreciated that additional sensor data may be removed from the historical data for any reason. For example, the anomaly based scoping module 604 may remove additional sensor data immediately before and/or after failure. In some embodiments, the anomaly based scoping module 604 removes a predetermined amount of sensor data immediately before and/or after a detected failure when it is unknown when the failure specifically began and/or ended. In various embodiments, the anomaly based scoping module 604 removes a predetermined amount of sensor data immediately before and/or after a detected failure to remove data that may unduly influence the analysis. In one example, the anomaly based scoping module 604 removes 10 seconds of sensor data before and/or after a failure (e.g., 10 seconds of generator sensor data before and/or after a generator failure is detected).

In various embodiments, the anomaly based scoping module 604 generates filtered historical data after removing sensor data from the originally received (e.g., initial) historical data.

It will be appreciated that the anomaly based scoping module 604 may filter out different information depending on the failure data received. As such, the anomaly based scoping module 604 may filter out different data from different sets of historical time periods based on the different sets of failure data.

Figure 9:
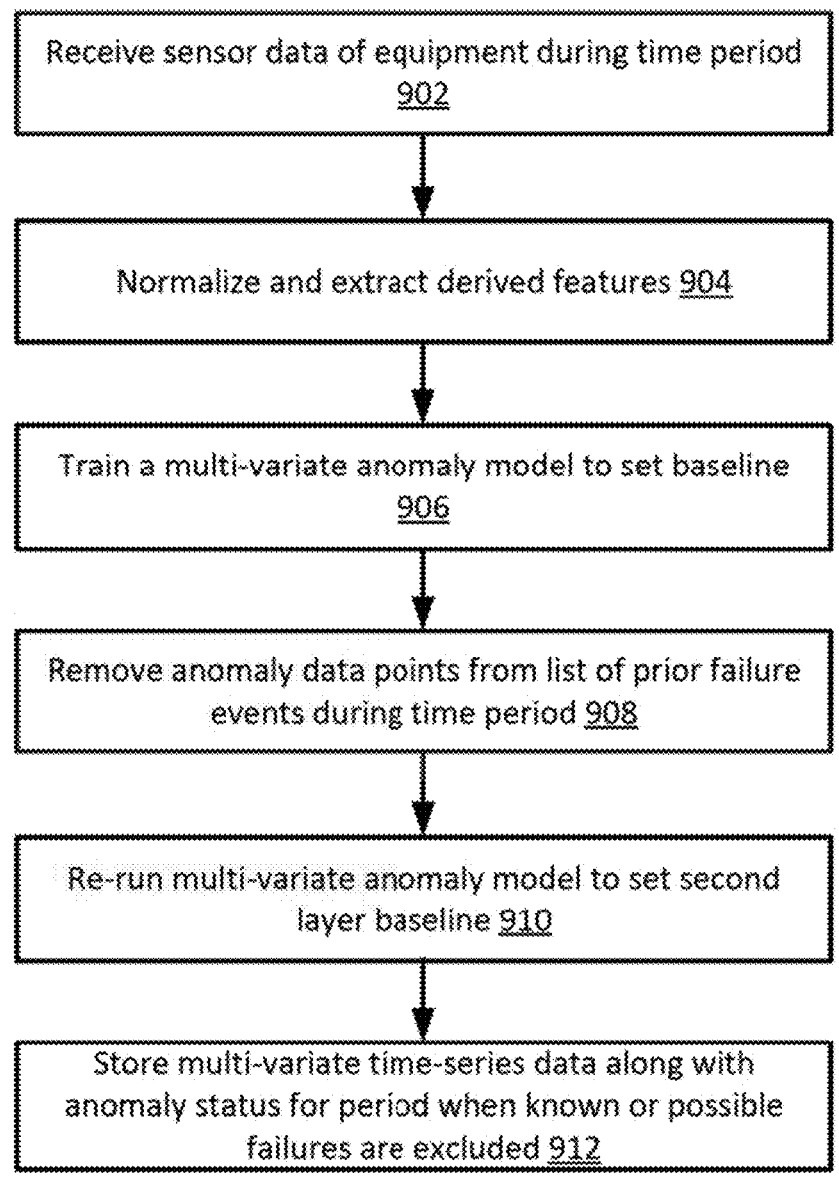
FIG. 9 is one example of removing sensor data from historical data associated with known or possible failure of a renewable energy asset in some embodiments.

FIG. 9 is one example of removing sensor data from historical data associated with known or possible failure of a renewable energy asset in some embodiments. As discussed herein, in step 902, the anomaly based scoping module 604 receives sensor data (e.g., multivariate data) from equipment during a first time period. In step 904, the anomaly based scoping module 604 and/or the factor analysis based scoping module 606 may optionally normalize and/or extract derived features from the received sensor data. In step 906, the factor analysis based scoping module 606 may train a multi-variate anomaly model to set a baseline. In various embodiments, the anomaly based scoping module 604 receives failure data and uses the failure data to set the baseline in order to identify sensor data at the time of known or possible failure. In step 908, the anomaly based scoping module 604 may remove anomaly data points (e.g., sensor data generated during failure) from list of prior failure events during time period.

Optionally, in step 910, the anomaly based scoping module 604 may re-run multi-variate anomaly model to set a second baseline. In step 912, the anomaly based scoping module 604 may optionally store multi-variate time-series data along with anomaly status for period when known or possible failures are excluded.

Figure 10:
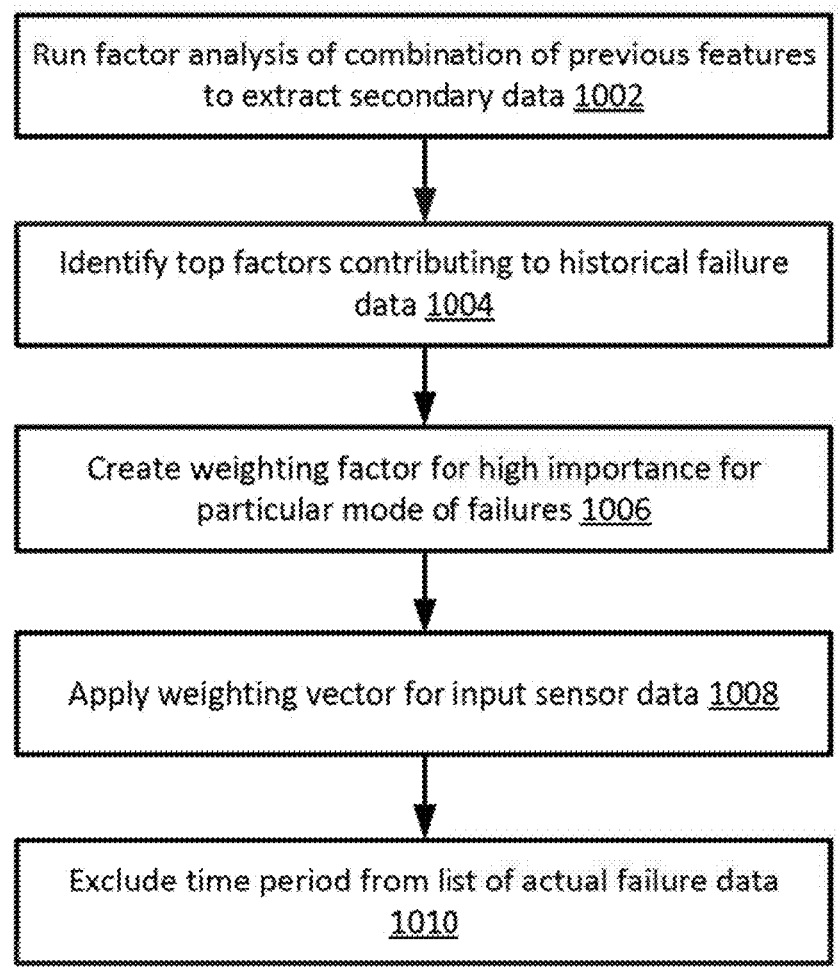
FIG. 10 is another example of removing sensor data from historical data associated with known or possible failure of a renewable energy asset in some embodiments

FIG. 10 is another example of removing sensor data from historical data associated with known or possible failure of a renewable energy asset in some embodiments. As discussed herein, in step 1002, the anomaly based scoping module 604 and/or the factor analysis based scoping module 606 may optionally run factor analysis of combination of previous features to extract secondary data. In step 1004, the anomaly based scoping module 604 may identify top factors contributing to the historical failure data (e.g., failures or potential failures identified in the failure data). In step 1006, the anomaly based scoping module 604 may create a weighting factor for high importance for particular modes of failures to identify particularly relevant or significant failures and/or modes of failures. In step 1008, the anomaly based scoping module 604 may apply weighting vector on received sensor data from the historical data. In step 1010, the anomaly based scoping module 604 excludes (e.g., removes) time series data from list of actual failures or potential failures (e.g., from the failure data).

In step 804, the factor analysis based scoping module 606 may optionally perform factor analysis based scoping on the filtered historical data from the anomaly based scoping module 604. As discussed herein, the factor analysis based scoping module 606 may run a factor analysis of a combination of previous features to extract secondary data. The factor analysis based scoping module 606 may identify the top factors (e.g., most significant factors relative to other factors) that contribute to the failure indicated in the failure data. As a result, the factor analysis based scoping module 606 may create a weighting vector for high importance for particular modes of failures. The factor analysis based scoping module 606 may perform initial scoping of sensor variable values by applying the weight vector.

The factor analysis based scoping module 606 may apply the weighting vector on some sensor data of the filtered historical data. In various embodiments, the factor analysis based scoping module 606 may apply component analysis (e.g., principal component analysis), sample variance, or the like. The factor analysis based scoping module 606 may apply mean value clustering. In some embodiments, the factor analysis based scoping module 606 may assess data from a vibration sensor to determine zero crossing data and aggregate the information over time. The factor analysis based scoping module 606 may identify components/features of the data using different methods for different data of different sensors.

In step 806, the training data preparation module 608 may optionally build a predictive model based on the second layer baseline from the anomaly based scoping module 604 and the primary scoping of data from the factor analysis based scoping module 606. In some embodiments training data is prepared as a tuple of anomaly score timeseries, fault score timeseries, an indicator variable showing particular mode of fault that occurred in the desired time period (e.g., 45 day lead time).

In step 808, the model training module 610 may utilize classification algorithms for model training. The classifications may include for example SVM, DeepLearning (such as CNN or CHAID). The training model input may include balanced input such as, for example, scoped anomaly time series, scoped weighted sensor timeseries, and failure indications. In some embodiments the timeseries data is a matrix where the start time the end time of the timeseries include maximum lead time, minimum lead time, and per desired time horizon (e.g., 45 days to 10 days before an event). In various embodiments, model training module 610 utilizes a random forest or isolation forest to classify different sensor data of the filtered historical data (e.g., the historical data without the sensor data at the time of failures that was previously removed).

In some embodiments, the model training module 610 may utilize the random forest or isolation forest to classify or categorize a state associated with an identified failure from the failure data. Different states may be associated with different failures. In some embodiments, the model training module 610 classifies or categorizes states (e.g., one or more sensor data readings) at a time (e.g., predetermined or undetermined time) before a known failure. The classified state may indicate a combination of features and/or sensor readings that signal an upcoming failure or a possible upcoming failure. Different classified states may include different features, different combination of features, sensors, and/or sensor readings based on the type of failure (e.g., the component that is failing) and/or how the component is failing.

In step 810, the model scoring module 612 may provide a probability of failure within the predefined lead time interval (e.g., a state of sensor readings at a time before a potential failure as discussed regarding the model training module 610). In various embodiments, a distribution may be generated based on the fit of one or more sensor readings (e.g., the sensor data from one or more sensors) to the state identified by the model training module. This may generate a function to be applied to later data.

In step 812, the evaluation module 614 may receive new sensor data after the models have been trained. The evaluation module 614 may assess all or some of the new sensor data using any number of the models generated by the model training module 610 to determine if a state is present.

In some embodiments, the evaluation module 614 and/or the model scoring module 612 may apply the scoring function to determine a degree of fit or confidence of fit and/or a likelihood of the failure based on the state of the sensor readings.

Based on a comparison of the state with a threshold and/or a score with a threshold, the report and alert generation module 616 may generate an alert. The alert may be a message or other signal that may indicate the type of failure that may occur, the wind turbine associated with the failure, the lead time before the expected failure, and/or any other information.

In step 616, the report and alert generation module 616 may generate a report indicating any number of possible failures, scores indicating likelihood of failure or confidence of sensor data fit to a previously identified state, and/or the like.

It will be appreciated that the model may be periodically updated. For example a predetermined intervals and/or times, updated historical data failure data may be received or previously received data may be used to retrain existing models or create new models. In one example, an older subset of previously received historical data may be removed and replaced with recently received sensor data. Some data associated with known failures (e.g., from new failure data) may be removed, new data features may be optionally re-identified, and states re-identified so that new models may be created with new categories to apply to new data.

Although these examples are directed to renewable energy assets, such as wind turbines and solar panel energy generators, it will be appreciated that any systems and methods used herein may be applied to any energy assets, renewable energy assets, or any hardware systems that generate data associated with performance over a period of time.

Figure 11:
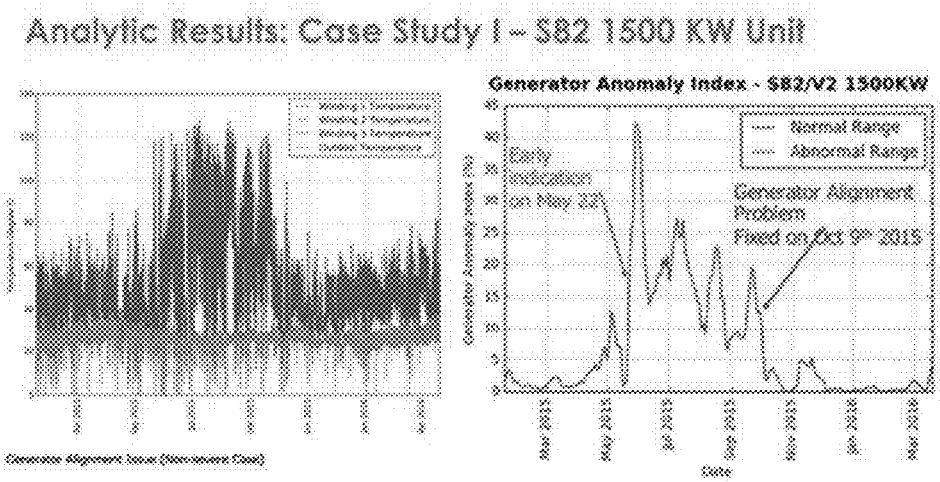
FIG. 11 depicts analytic results including a case study using some embodiments.

FIG. 11 depicts analytic results including a case study using some embodiments. The generator alignment issue in graph 1102 depicts raw data of a non-severe case. The Y axis of graph 1102 is in temperature (C) and the X axis is over time (e.g., March 2015-March 2016). The graph includes sensor readings of temperatures of three different windings as well as outdoor temperature (the outdoor temperature is consistently below 40° C.). Graph 1104 is a generator anomaly index (e.g., generated by the report in alert generation module 316) with an X axis indicating a percentage of generator anomaly index and a Y axis of time (e.g., March, 2015-March, 2016). In this example, there is an early indication of failure on May 2 and the generator alignment problem is fixed on Oct. 9, 2015 prior to failure. Note that during the failure, There is not a high value for the anomaly index showing that the component failure prediction system 104 is forecasting as opposed to detecting an existing condition.

Figure 12:
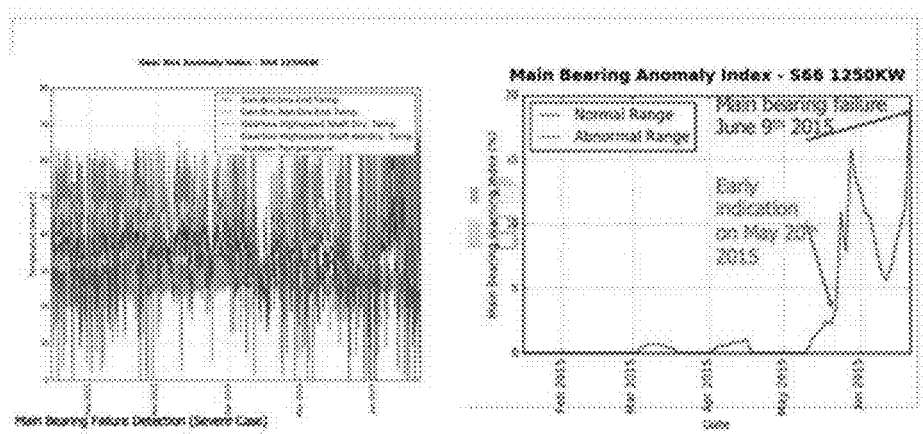
FIG. 12 depicts analytic results including a case study using some embodiments.

FIG. 12 depicts analytic results including a case study using some embodiments. The main bearing failure issue in graph 1202 depicts raw data of a severe case. The Y axis of graph 1202 is in temperature (C) and the X axis is over time (e.g., February 2015-June 2015). The graph 1202 includes sensor readings of temperatures of generator drive and temperature, generator nondriving temperature, gearbox high-speed shaft Drive temperature, gearbox high-speed shaft nondriving temperature, and outdoor temperature. In graph 1202, the outdoor temperature is below 40° C. Graph 1204 is a main bearing anomaly index (e.g., generated by the report in alert generation module 316) with an X axis indicating a percentage of main bearing warning index and a Y axis of time (e.g., February 2015-June 2015). In this example, there is an early indication of failure on May 20 and the main bearing failure on Jun. 9, 2015. A clear detection of the main bearing failure is shown in FIG. 1204 while the raw SCADA data fails to show the indication.

Figure 13:
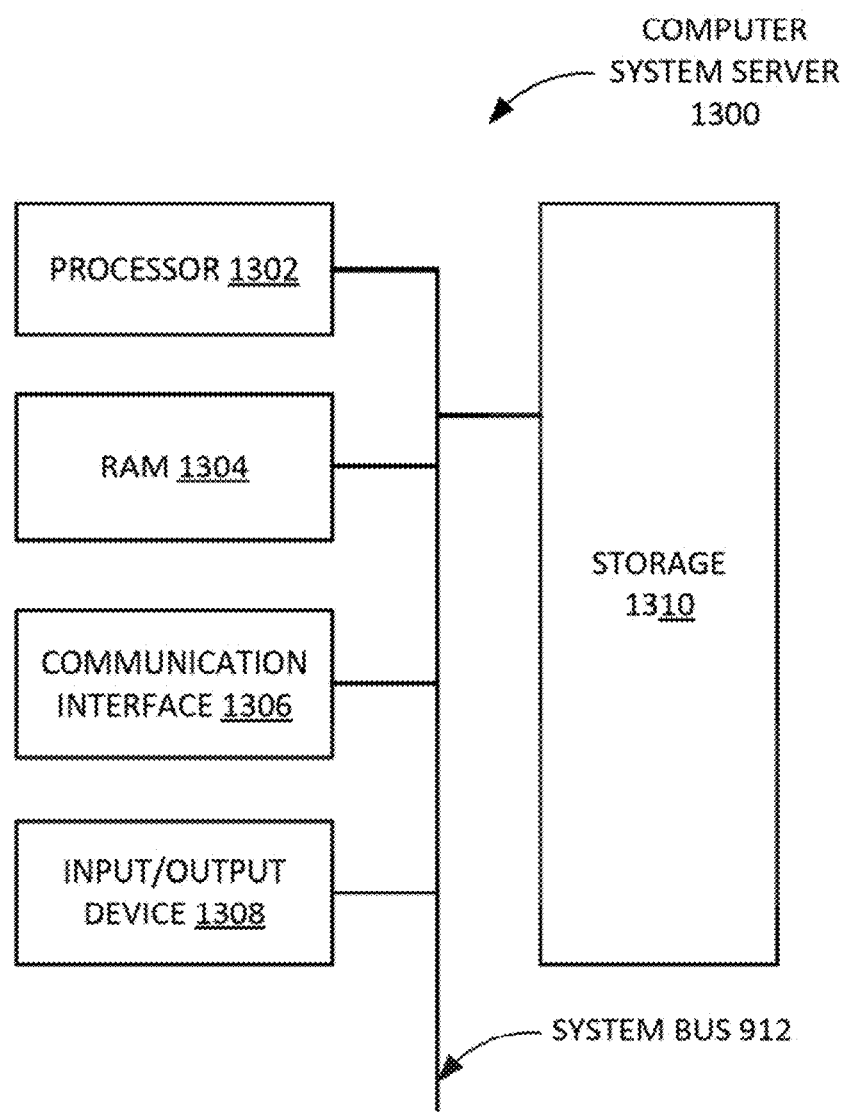
FIG. 13 depicts a block diagram of an example computer system server according to some embodiments.

FIG. 13 depicts a block diagram of an example computer system server 1300 according to some embodiments. Computer system server 1300 is shown in the form of a general-purpose computing device. Computer system server 1300 includes processor 1302, RAM 1304, communication interface 1306, input/output device 1308, storage 1310, and a system bus 1312 that couples various system components including storage 1310 to processor 1302.

System bus 1312 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system server 1300 typically includes a variety of computer system readable media. Such media may be any available media that is accessible by congestion mitigation system 1304 and it includes both volatile and nonvolatile media, removable and non-removable media.

In some embodiments, processor 1302 is configured to execute executable instructions (e.g., programs). In some embodiments, the processor 1004 comprises circuitry or any processor capable of processing the executable instructions.

In some embodiments, RAM 1304 stores data. In various embodiments, working data is stored within RAM 1306. The data within RAM 1306 may be cleared or ultimately transferred to storage 1310.

In some embodiments, communication interface 1306 is coupled to a network via communication interface 1306. Such communication can occur via Input/Output (I/O) device 1308. Still yet, congestion mitigation system 1304 can communicate with one or more networks such as a local area network (LAN), a general wide area network (WAN), and/or a public network (e.g., the Internet).

In some embodiments, input/output device 1308 is any device that inputs data (e.g., mouse, keyboard, stylus) or outputs data (e.g., speaker, display, virtual reality headset).

In some embodiments, storage 1310 can include computer system readable media in the form of volatile memory, such as read only memory (ROM) and/or cache memory. Storage 1310 may further include other removable/non-removable, volatile/non-volatile computer system storage media. By way of example only, storage 1310 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 1312 by one or more data media interfaces. As will be further depicted and described below, storage 1310 may include at least one program product having a set (e.g., at least one) of program modules that are configured to carry out the functions of embodiments of the invention. In some embodiments, RAM 1304 is found within storage 1310.

Program/utility, having a set (at least one) of program modules, such as congestion mitigation system 1304, may be stored in storage 1310 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with congestion mitigation system 1304. Examples, include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A non-transitory computer readable medium comprising executable instructions, the executable instructions being executable by one or more processors to perform a method, the method comprising:
   receiving first historical data of a first time period and failure data of the first time period, the first historical data including sensor data from one or more sensors of an electrical network;
   identifying failure data of the first historical data that was generated by the one or more sensors of the electrical network during a first failure of a component of the electrical network during a failure indicated by a failure time period of the first time period;

removing the failure data from the first historical data to create filtered historical data;

training a classification model using the filtered historical data, the classification model indicating at least one first classified state of the electrical network at a second period of time prior to the first failure indicated by the failure data;

applying the classification model to second sensor data to identify a first potential failure state based on the at least one first classified state, the second sensor data being from the one or more sensors of the electrical network during a subsequent time period after the first time period;

generating an alert if the first potential failure state is identified based on at least a first subset of sensor signals generated during the subsequent time period; and providing the alert.

2. The non-transitory computer readable medium of claim 1, wherein the components of the electrical network is a wind turbine or a solar panel.

3. The non-transitory computer readable medium of claim 1, wherein the at least one first classified state of the electrical network is based on a subset of sensor readings generated prior to the failure and not all of the sensor readings of the first historical data generated prior to the failure.

4. The non-transitory computer readable medium of claim 1, wherein the second period of time is a desired number of days before a predicted failure associated with the first potential failure state.

5. The non-transitory computer readable medium of claim 4, wherein the alert is provided at the desired number of days.

6. The non-transitory computer readable medium of claim 1, the method further comprising:

training the classification model using the filtered historical data, the classification model indicating at least one second classified state of the electrical network at the second period of time prior to a third failure indicated by the failure data;

applying the classification model to second sensor data to identify a second potential failure state based on the at least one second classified state, the second sensor data being from the one or more sensors of the electrical network during the subsequent time period after the first time period, wherein the first potential failure state is associated with a failure of a first component of the electrical network and the second potential failure state is associated with a failure of a second component of the electrical network; and generating an alert if the second potential failure state is identified based on at least a second subset of sensor signals generated during the subsequent time period, the first subset of sensor signals not including at least one sensor signal of the second subset of sensor signals.

7. The non-transitory computer readable medium of claim 1, wherein identifying the at least some sensor data of the first historical data that was generated during the first failure indicated by the failure data comprises scanning at least some of the first historical data and comparing at least some of the sensor data of the first historical data to a failure threshold to identify at least some of the sensor data that was generated during the first failure.

8. The non-transitory computer readable medium of claim 1, wherein identifying the at least some sensor data of the first historical data that was generated during the first failure indicated by the failure data comprises:

identifying an amount of downtime based on the failure data;

scanning at least some of the first historical data; and comparing at least some of the sensor data of the first historical data to a failure threshold to identify at least some of the sensor data that was generated during the first failure until the amount of sensor data identified as failure based on the comparison is at least equal to the amount of downtime, wherein removing the at least some sensor data comprises removing the sensor data that was generated during the first failure.

9. The non-transitory computer readable medium of claim 1, further comprising generating a probability score based on a probability of the second sensor data fitting into the at least one first classified state, wherein generating the alert comprises comparing the probability score to a threshold score.

10. The non-transitory computer readable medium of claim 1, wherein providing the alert comprises providing a message indicating at least one component associated with the second sensor data may potentially fail.

11. A system, comprising:

at least one processor; and memory containing instructions, the instructions being executable by the at least one processor to:

receive first historical data of a first time period and failure data of the first time period, the first historical data including sensor data from one or more sensors of an electrical network;

identify failure data of the first historical data that was generated by the one or more sensors of the electrical network during a first failure of a component of the electrical network during a failure indicated by a failure time period of the first time period;

remove the failure data from the first historical data to create filtered historical data;

train a classification model using the filtered historical data, the classification model indicating at least one first classified state of the electrical network at a second period of time prior to the first failure indicated by the failure data;

apply the classification model to second sensor data to identify a first potential failure state based on the at least one first classified state, the second sensor data being from the one or more sensors of the electrical network during a subsequent time period after the first time period;

generate an alert if the first potential failure state is identified based on at least a first subset of sensor signals generated during the subsequent time period; and provide the alert.

12. The system of claim 11, wherein the at least one first classified state of the electrical network is based on a subset of sensor readings generated prior to the failure and not all of the sensor readings of the first historical data generated prior to the failure.

13. The system of claim 11, wherein the second period of time is a desired number of days before a predicted failure associated with the first potential failure state.

14. The system of claim 13, wherein the alert is provided at the desired number of days.

15. The system of claim 11, the instructions being executable by the at least one processor to further:

train the classification model using the filtered historical data, the classification model indicating at least one second classified state of the electrical network at the second period of time prior to a third failure indicated by the failure data;

apply the classification model to second sensor data to identify a second potential failure state based on the at least one second classified state, the second sensor data being from the one or more sensors of the electrical network during the subsequent time period after the first time period, wherein the first potential failure state is associated with a failure of a first component of the electrical network and the second potential failure state is associated with a failure of a second component of the electrical network; and generate an alert if the second potential failure state is identified based on at least a second subset of sensor signals generated during the subsequent time period, the first subset of sensor signals not including at least one sensor signal of the second subset of sensor signals.

16. The system of claim 11, wherein the instructions being executable by the at least one processor to identify the at least some sensor data of the first historical data that was generated during the first failure indicated by the failure data comprises scanning at least some of the first historical data and comparing at least some of the sensor data of the first historical data to a failure threshold to identify at least some of the sensor data that was generated during the first failure.

17. The system of claim 11, wherein the instructions being executable by the at least one processor to identify the at least some sensor data of the first historical data that was generated during the first failure indicated by the failure data comprises:

identify an amount of downtime based on the failure data;
scan at least some of the first historical data; and
compare at least some of the sensor data of the first historical data to a failure threshold to identify at least some of the sensor data that was generated during the first failure until the amount of sensor data identified as failure based on the comparison is at least equal to the amount of downtime, wherein removing the at least some sensor data comprises removing the sensor data that was generated during the first failure.

18. The system of claim 11, wherein the instructions being executable by the at least one processor further generate a probability score based on a probability of the second sensor data fitting into the at least one first classified state, wherein generating the alert comprises comparing the probability score to a threshold score.

19. The system of claim 11, wherein the instructions being executable by the at least one processor to provide the alert comprises the instructions being executable by the at least one processor to provide a message indicating at least one component associated with the second sensor data may potentially fail.

20. A method comprising:
receiving first historical data of a first time period and failure data of the first time period, the first historical data including sensor data from one or more sensors of an electrical network;
identifying failure data of the first historical data that was generated by the one or more sensors of the electrical network during a first failure of a component of the electrical network during a failure indicated by a failure time period of the first time period;
removing the failure data from the first historical data to create filtered historical data;
training a classification model using the filtered historical data, the classification model indicating at least one first classified state of the electrical network at a second period of time prior to the first failure indicated by the failure data;
applying the classification model to second sensor data to identify a first potential failure state based on the at least one first classified state, the second sensor data being from the one or more sensors of the electrical network during a subsequent time period after the first time period;
generating an alert if the first potential failure state is identified based on at least a first subset of sensor signals generated during the subsequent time period; and
providing the alert.

* * * * *